UNITED STATES PATENT OFFICE

CHARLES A. BIHL, OF SAN ANTONIO, TEXAS.

IMPROVEMENT IN MEDICINAL EXTRACTS.

Specification forming part of Letters Patent No. 153,038, dated July 14, 1874; application filed April 18, 1874.

*To all whom it may concern:*

Be it known that I, CHARLES A. BIHL, of San Antonio, in the county of Bexar and State of Texas, have invented a new and valuable Improvement in Medicines; and I do hereby declare that the following is a full, clear, and exact description of the same.

This invention has for its object utilizing a plant which has hitherto been considered of no value, either medicinally or for food. This plant is commonly known in the southern part of the United States by the name "mountain cabbage," but the botanical name is *Dasylirion graminifolium*, and belongs to the order *Bromeliaceæ*.

I have discovered that this plant possesses medicinal properties as a febrifuge and a stomachal, and that it can be administered with success in the following manner: The root or bulb of the mountain cabbage is first roasted, after which it is finely ground or mashed, and then put into a vat of water and allowed to remain therein for the space of five or six days. About one-third of water is added to about two-thirds of the root. At the end of the time specified the fluid will be found to have attained a deep-yellow color, and to have passed through a process of fermentation without the addition of any other substance to effect this. I have successfully treated with this watery extract dysentery and diarrhea, and greatly relieved persons of nervous debility.

In some instances I have used it externally in the removal of rheumatism and catarrhal pains of the body.

What I claim, and desire to secure by Letters Patent, is—

A liquor or watery extract produced from the mountain cabbage, as herein set forth.

In testimony that I claim the above I have hereunto subscribed my name in the presence of two witnesses.

CHARLES ALBERT BIHL.

Witnesses:
  C. F. BUSSI,
  ANTON ADAM.